United States Patent Office 3,262,985
Patented July 26, 1966

3,262,985
SELF-CROSSLINKING POLYMERS
Erwin Müller, Leverkusen, and Karl Dinges, Cologne-Stammheim, Germany, assignors to Farbenfabriken Bayer Aktiengesellschaft, Leverkusen, Germany, a German corporation
No Drawing. Filed Jan. 11, 1963, Ser. No. 250,773
Claims priority, application Germany, Jan. 31, 1962, F 35,885
18 Claims. (Cl. 260—80.3)

The present invention relates to polymers containing substituted methylol amide groups and having self-crosslinking properties as well as a process for producing such polymers.

It is known that acrylic or methacrylic acid amides in which the amide groups have been substituted by reactive groups such as methylol, methylolalkyl ether or tertiary amino methylene groups, may be polymerized under such conditions that the abovementioned monomers are incorporated in the resulting film-forming polymers without splitting off of the reactive group.

The reactive groups of these polymers may be split off by heat and/or acid catalysts, the polymers being thereby converted into crosslinked insoluble products. These polymers do not fulfil all the necessary practical requirements. For example, polymers with free methylol groups may become useless if they are left to stand for a long time at room temperature, owing to the fact that they have a tendency to crosslink. Polymers with methylol ether groups do not show this behaviour, but on the other hand their crosslinking temperatures are too high for some purposes. The known polymers are usually crosslinked in the presence of acids and/or acid donors, because cross-linking then generally takes place more rapidly and at lower temperatures than when heat alone is employed. However, for certain purposes it is desirable to use polymers which may be cross-linked just as rapidly and easily in the absence of acids and/or acid donors than the known products in the presence of these catalysts.

It has now been found that film-forming polymers which are very stable in storage and very readily crosslinked may be obtained by using amides of polymerizable olefinically unsaturated carboxylic acids, such as amides of the acrylic acids, whose amide groups have been substituted by acylated methylol groups.

Suitable monomers for the preparation of the said polymers are, for example, compounds of the general formula:

(I)
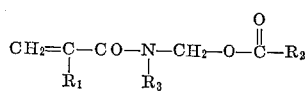

where $R_1$ is a hydrogen atom, an alkyl radical, particularly $CH_3$, or a halogen atom, particularly Cl;

is an acyl radical of an organic carboxylic acid, such as an aliphatic carboxylic acid, a cycloaliphatic, aromatic, araliphatic or heterocyclic carboxylic acid; $R_2$ itself preferably represents an aliphatic saturated hydrocarbon radical having from 2 to 20 carbon atoms, a cycloaliphatic radical, especially a cyclohexyl radical, an aromatic radical, especially a phenyl radical, an araliphatic radical, especially a benzyl radical or a heterocyclic ring system, especially a pyridine, piperidine or pyrrolidine ring.

$R_3$ is a hydrogen atom, an alkyl, aryl or aralkyl radical; advantageously $R_3$ represents a hydrogen atom or a methyl group.

Examples of particular compounds of the above-mentioned class are: N-acylmethylolamides of acrylic acid, methacrylic acid or α-chloroacrylic acid in which the acyl radicals may be derived from acetic acid, propionic acid, butyric acid, caproic acid, oleic acid, benzoic acid, phthalic acid, maleic acid or succinic acid or the half-esters of the said dicarboxylic acids with monohydric alcohols, and particularly the acetal derivatives of the said methylolamides.

Compounds of the above-mentioned type may be prepared by the process described in German patent application No. F 35,884 of January 31, 1962, by treating acrylic acid N-methylolamides or methacrylic acid N-methylolamides with acid anhydrides. According to this process, for example, N-methylol-acrylic acid amide or N-methylol-methacrylic acid amide is treated with acetic anhydride or propionic acid anhydride in the absence of acid acceptors and the corresponding acyl compounds are obtained in excellent yields. Ketenes and diketenes may also be used for the acylation. The acylating agents are generally used in excess of the calculated quantity. The process may be carried out by introducing the methylol compounds, such or in solution, into the acid anhydride. Acylation then takes place at temperatures up to about 100° C. The preparation of the methylol compounds and the acylation thereof may also be carried out in a one-vessel process. In this case, the unsaturated carboxylic acid amide may, for example, be introduced with formaldehyde in the first stage in the presence of a basic compound in an inert solvent, and the reaction product may be treated in the second stage with the acid anhydride in the same reaction medium. In addition, N-methylol amides of α,β-olefinically unsaturated carboxylic acids may be acylated by means of acid halides, particularly acid chlorides, in the presence of acid-forming agents such as pyridine by the Schotten-Baumann reaction.

The monomers that are used in accordance with the invention may be polymerized separately to form homopolymers, or may be polymerized as mixtures with each other, for example in substance or in solution or in aqueous emulsions. It is preferable to use the monomers according to Formula I in admixture with other olefinically unsaturated monomers having at least one, preferably one or two $CH_2=C<$-groupings to prepare copolymers, in which case the monomers according to Formula I are used in quantities of about 0.2 to 50, preferably 0.5 to 30% by weight.

Examples of suitable olefinically unsaturated monomers which may be used as components for the copolymerization are:

(a) α,β-Olefinically unsaturated monocarboxylic acids and their derivatives such as acrylic and methacrylic acid amides, acryl and methacryl nitrile, esters of acrylic and methacrylic acid, particularly those with saturated monohydric aliphatic or cycloaliphatic alcohols with 1 to 20 carbon atoms, such as esters of the above-mentioned acids with methyl-, ethyl-, propyl-, isopropyl-, isobutyl, hexyl-, octyl-, stearyl-alcohol, cyclohexanol, methylcyclohexanol, and with benzyl alcohol, phenol, cresol or furfuryl alcohol;

(b) Aromatic monovinyl compounds, i.e. styrenes such as styrene itself, α-methyl-styrene, vinyl toluene, p-chlorostyrene or other vinyl benzenes substituted in the nucleus;

(c) Esters of vinyl alcohol with an aliphatic saturated acid such as vinyl acetate, vinyl propionate, vinyl butyrate or with hydrohalic acids, vinyl ethers, vinyl ketones, such as vinyl chloride, vinylidene chloride, vinyl ethyl ether, vinylisobutyl ether;

(d) Conjugated aliphatic diolefines with 4 to 6 carbon atoms, such as butadiene, isoprene, 2,3-dimethylbutadiene, chloroprene;

(e) N-methylolethers of acrylic acid amide and methacrylic acid amide according to the general formula.

(II) 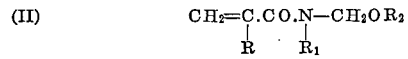

in which R represents a hydrogen atom or a methyl radical, $R_1$ represents a hydrogen atom or an alkyl, aralkyl or aryl radical, $R_2$ represents an alkyl or cycloalkyl radical, e.g. methyl, ethyl, n-propyl, isopropyl, n-butyl, isobutyl, or cyclohexyl (see German Auslegeschrift 1,035,363);

(f) Mannich bases of acrylic acid amide and methacrylic acid amide according to the general formula:

(III) 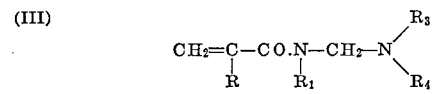

in which R and $R_1$ have the same meaning as in Formula II, and $R_3$ and $R_4$ represent alkyl, cycloalkyl, or aralkyl radicals or together represent a heterocyclic radical such as the morpholine radical. Suitable compounds of this type are mentioned in Auslegeschrift No. 1,102,404.

In addition to the above, other monoolefinically unsaturated monomers may be used as copolymerization components, for example esters of maleic acid, fumaric acid or crotonic acid styrene sulphonic acid or unsaturated aliphatic or cycloaliphatic hydrocarbons. In addition monomers which have a crosslinking action and which contain several non-conjugated olefinically unsaturated groups may be used in proportions of about 0.01 to 5, preferably 0.01 to 3% by weight calculated on the total weight of monomers, especially diallyl monomers and triallyl monomers with isolated allyl groupings; examples of these are glycol diacrylate, glycol dimethacrylate, acrylic acid and/or methacrylic acid allyl esters, divinylbenzene, triacrylylperhydro-s-triazine, triallyl cyanurate triallylphosphate or substitution products of the above compounds.

The copolymers may be prepared from two or more monomers belonging to different classes of compounds. The monomers will be chosen according to the properties that are required of the copolymer.

Of particular interest are copolymers which contain one or more monomers that have a reinforcing action, i.e. monomers which increase the hardness of the copolymer into which they have been incorporated, and at least one monomer which has an elasticizing effect. Suitable monomers which have an elasticizing effect are conjugated diolefines, esters of acrylic acid with more than two carbon atoms in the ester group, and esters of methacrylic acid with more than four carbon atoms in the ester group. The amount of elasticizing monomers in the total quantity of monomers used is preferably 40 to 90% by weight. Examples of suitable monomers that have a reinforcing action are styrene, substituted styrenes, acrylonitrile, methacrylonitrile, vinyl chloride, vinylidene chloride or esters of acrylic or methacrylic acid with lower alcohols. These monomers may be used in proportions of 1 to 40% by weight calculated on the total quantity of monomers.

The monomers which contain carboxyl groups, e.g. acrylic and methacrylic acid, are generally incorporated in relatively small quantities into the copolymers unless it is desired to produce copolymers having marked hydrophilic properties. To prepare copolymers by polymerization of the monomers in aqueous emulsion, the said olefinically unsaturated acids are used preferably in quantities of 0.1 to 10% by weight, calculated on the total weight of monomers. The amides of the said acids are also used preferably in the above-mentioned quantities.

The monomers according to the general Formulas II and III are advantageously used in quantities of 0.1 to 15% by weight calculated on the total weight of monomers. The copolymerization of the monomers may be carried out by methods known per se, particularly in organic solvents or in an aqueous medium.

Aqueous copolymer dispersions are obtained by copolymerizing the above-mentioned monomers in aqueous dispersion with the aid of emulsifiers by methods known per se. Either cationic or anionic or non-ionic emulsifiers or combinations thereof may be used.

Examples of suitable anionic emulsifiers are: higher fatty acids, resinic acids, acidic fatty alcohol sulphuric acid esters, higher alkyl sulphonates and alkyl aryl sulphonates, sulphonated castor oil, higher hydroxy-alkyl sulphonates, sulphosuccinic acid esters, salts of fatty acid condensation products with hydroxy-alkyl carboxylic acids, aminoalkylcarboxylic acids and the water-soluble salts of sulphonated ethylene oxide adducts.

Examples of cationic emulsifiers are: salts of alkyl amines, aryl-, alkylaryl- or resinic-amines and inorganic acids and salts of quaternary ammonium compounds.

Suitable non-ionic emulsifiers are the known reaction products of ethylene oxide with long chain fatty alcohols, such as cetyl, lauric, oleyl or octadecyl alcohol or phenols, such as octyl- or dodecylphenol, and it is particularly advantageous to use reaction products of more than 10 mols, preferably 15 to 30 mols of ethylene oxide with 1 mol fatty alcohol or phenol.

The total quantity of the above emulsifiers may be between 0.5 and 20%, calculated on the total quantity of monomers. Between 2 and 10% are preferably used.

According to a particular method of carrying out the present invention, only non-ionic emulsifiers or mixtures of these emulsifiers with up to 0.5% of cationic and/or anionic emulsifiers calculated on the polymer are used. Very stable latices are obtained by this method. If COOH, $CONH_2$, $SO_3H$ or other hydrophilic groups are all contained together in the polymer, these latices are highly reemulsifiable. Reemulsifiability is here understood to mean that the film, obtained from the copolymer latex by drying at room temperature at pH about 7, may still be redispersed with water up to a certain time.

For the preparation of graft polymers, the polymerization or copolymerization of the above monomers may be carried out in known manner in the presence of polymers or copolymers of conjugated diolefines, such as butadiene, or other preformed polymers which contain olefinic double bonds.

Although polymerization is preferably carried out at temperatures of about 10° C. to 50° C., temperatures up to about 80° C. may be employed.

The pH at which the copolymers are prepared may vary within wide limits but is preferably between 4 and 9, whereas in the preparation of reemulsifiable latices it has been found advantageous to maintain the pH between 4 and 6. The latices are generally adjusted to pH 6.5 to 9 when polymerization has finished, as this increases the stability of the products. Compounds which regulate the molecular weight, such as long chained alkyl mercaptans, diisopropyl xanthogenate and others may be used in the polymerization.

Compounds which may be used as polymerization catalysts include inorganic per-compounds such as potassium or ammonium persulphate, hydrogen peroxide, percarbonates, organic peroxy compounds such as acyl peroxides (for example benzoyl peroxide), alkyl hydroperoxides (such as tertiary butyl hydroperoxide, cumene hydroperoxide and p-menthane hydroperoxide), and dialkyl peroxides such as di-tertiary-butyl peroxide. The inorganic or organic per-compounds are preferably used in combination with reducing agents known per se. Suitable reducing agents are, for example, sodium pyrosulphite or bisulphite, sodium formaldehyde sulphoxylate or triethanolamine.

Suitable catalysts are furthermore nitrogen compounds capable of decomposing to form free radicals, i.e. organic azo compounds containing an acyclic azo grouping, the nitrogen atoms of which are bonded to aliphatic carbon atoms, such as azo diisobutyric acid dinitrile.

The catalysts are used in the quantities generally employed for polymerizations of this type, i.e. between 0.01 and 5% calculated on the total quantity of monomers.

The polymers and copolymers obtained according to the invention contain esterified methylol amide groups which are split at elevated temperatures and/or by the action of acid catalysts and at the same time bring about self-crosslinking of the polymers with formation of insoluble cross-linked products. Owing to the fact that they are converted into insoluble cross-linked products even under mild conditions, the said polymers and copolymers may be used for the manufacture of any formed articles such as coatings on metal, wood, leather, impregnations of paper and adhesives for compounding leather and textiles, etc. These may be prepared by adjusting the dispersions to an acid pH, preferably 2 to 5, by means of suitable acids or acidifying compounds such as hydrochloric acid, sulphuric acid, phosphoric acid, acetic acid, trichloroacetic acid, ammonium chloride or acid phosphates, and then applying the dispersions onto suitable foundations and then evaporating off the water at elevated temperatures, when crosslinking of the polymers takes place.

One preferred method consists in effecting crosslinking of the polymers after evaporation of the solvent or the water (in case of dispersions) merely by the action of heat without the addition of acids and/or acid donors. Temperatures of 20° C. (over a period of about 2 to 10 days) to 200° C. (over a period of some seconds or minutes), preferably 50 to 150° C. have been found to be suitable. At temperatures between 130° and 150° C., for example heating periods of between 0.5 and 5 minutes have proved advantageous.

Although in principle it is possible to use the polymers and copolymers prepared according to the invention for manufacture of formed articles without incorporating additional crosslinking agents, it may in some cases be advantageous to add crosslinking agents to these products, particularly in the case of copolymers, in order to bring about additional crosslinking of the formed articles. Suitable crosslinking agents are compounds which contain methylol groups and which are condensation products of formaldehyde with urea, melamine or alkylmethylol ether derivatives of such compounds.

In the following examples, the parts are parts by weight unless otherwise indicated.

*Example 1*

A mixture of 116 parts of butyl acrylate and 73 parts of styrene in a solution of 5 parts of acrylamide, 6 parts of a sodium salt of a fatty alcohol sulphuric acid ester with 10 to 16 carbon atoms, 6 parts of a reaction product of hydroxydiphenylmethane with 13 to 15 mols ethylene oxide and 6 parts of the copolymerization components given in the table below is emulsified in 300 parts of water in a reaction vessel fitted with stirring apparatus and thermometer, when the temperature has been raised to 40° C., 0.8 part potassium persulphate and 1.2 parts sodium pyrosulphite are added. Polymerization is carried out at about 45° C. A copolymer emulsion with 38% solids content is obtained. A portion of this copolymer emulsion is adjusted with dilute sulphuric acid to pH 2.0 and dried on glass plates at room temperature (experimental series I). Another portion of the copolymer emulsion is adjusted to pH 7 and treated in the same way (experimental series II). After 20 hours, the solubility of the polymer film in dimethylformamide is tested. The results obtained are summarized in the following table.

| Experiment No. | Copolymerization component | Solubility in dimethyl formamide I | Solubility in dimethyl formamide II |
|---|---|---|---|
| 1 | $H_2C=CH-CO-NH-CH_2-O-\overset{O}{\underset{\|}{C}}-CH_3$ | 0 | 1 |
| 2 | $CH_2=\underset{CH_3}{\overset{\|}{C}}-CONH-CH_2-O-\overset{O}{\underset{\|}{C}}-CH_3$ | 0 | 1 |
| 3 | $CH_2=\underset{CH_3}{\overset{\|}{C}}-CONH-CH_2-O-CO-C_6H_5$ | 0 | 0 |
| 4 | $CH_2=\underset{CH_3}{\overset{\|}{C}}-CONH-CH_2-O-CO-C_5H_4N$ | 0 | 0 |
| 5 | $H_2C=\underset{CH_3}{\overset{\|}{C}}-CO-NH-CH_2-OCH_3$ | 2 | 2 |

0=insoluble; 1=partially soluble; 2=soluble.

Experiment No. 5 was carried out as a comparison test using a known emulsion in which the copolymer contained reactive methylolmethyl ether groups. This series of experiments showed that the copolymer emulsions according to the invention are much more easily crosslinked than products obtained according to the prior art. In this example the specific copolymerization component according to Formula I can be replaced by compounds which represent methylol esters of acrylic acid amide, methacrylic acid amide, α-chloroacrylic acid amide on the one hand and propionic acid, butyric acid, lauric acid, oleic acid, phthalic acid on the other hand.

Instead of butyl acrylate homologous acrylates such as methyl acrylate, instead of styrene a vinyl toluene were applied. In a further experiment the above monomers had been substituted by vinylacetate and vinylmethyl ketone.

*Example 2*

A solution composed of 430 parts of water and 20 parts of a reaction product obtained from 1 mol cetyl alcohol and 13 to 15 parts ethylene oxide is introduced into a reaction vessel fitted with a stirring apparatus, and about 1/10 of a mixture of monomers composed of 20 parts of butyl acrylate, 10 parts of acrylic acid, 30 parts of methyl acrylate, 98 parts of acrylonitrile and 0.2 part of N-dodecylmercaptan are emulsified in this solution. After the air has been displaced by nitrogen and the mixture has been heated to 35° C., polymerization is started by the addition of 0.5 part potassium persulphate and 1.0 part sodium pyrosulphite. The following four substances are then introduced at a uniform rate from four dropping funnels in the course of 3 hours:

(a) The remaining monomer mixture,
(b) a solution of 20 parts of the compound

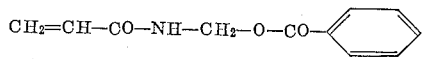

in 100 parts of water,
(c) A solution of 3 parts of sodium pyrosulphite in 50 parts of water, and
(d) A solution of 2 parts of potassium persulphate in 170 parts of water.

The polymerization temperature is kept at 40 to 45° C. by external cooling means. The mixture is then kept stirred and polymerization is completed in 1 to 2 hours. The dispersion, which has a concentration of about 38%, is then adjusted to a pH of about 7. A few drops of this dispersion rubbed dry in the palm of the hand may be redispersed with water to form the original dispersion.

Films prepared from this dispersion and heated for a short time at 120° C. or left for some time at room temperature swell only very slightly in water.

In this example instead of the acrylic acid amide methylol ester of benzoic acid the corresponding methacrylic acid amide methylol ester of benzoic acid and furthermore of cyclohexane monocarboxylic acid was employed without disadvantages.

*Example 3*

200 cc. of a citrate solution are mixed with 200 cc. of a N/10-sodium hydroxide solution in a 2-liter glass vessel. The citrate solution contains 21.0 g. of citric acid per liter and 200 cc. of N NaOH. 100 g. of the compound

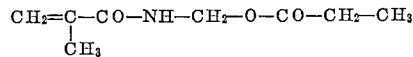

are dissolved in this mixture. When the temperature has been adjusted to 40 to 43° C., polymerization is started by the addition of 1.0 g. potassium persulphate and 2.0 g. sodium pyrosulphite. The pH during polymerization is 5 to 6. Polymerization is completed after 5 hours. The 10% polymer solution thereby obtained is crosslinked both by the addition of strong acid (pH=2 to 3) and by the addition of alkali (pH=9).

Copolymers of methylol ester with acrylamide may be obtained in the same manner by using 60 g. acrylamide and 40 g. methylol ester instead of 100 g. of the above compound.

*Example 4*

750 g. of the compound $$CH_2=CH-CO-NH-CH_2-O-CO-CH_3$$

are dissolved in a mixture of 1250 g. glycol and 1000 g. acetone and treated with 2.5 g. potassium persulphate and with 3.75 g. sodium pyrosulphite (in each case dissolved in 100 cc. water). Polymerization is carried out at 40° C. for about 10 to 12 hours, vigorous stirring being maintained. A white powder that is filtered off and dried is obtained in a yield of about 80%. The polymer is readily soluble in water and its K-value is 61.

*Example 5*

560 g. of desalted water and 40 g. of a reaction product from 1 mol cetyl alcohol and 13–15 parts of ethylene oxide were placed into a reaction vessel fitted with a stirrer, nitrogen inlet tube and a dropping-funnel.

This solution is heated to 40° C. and a mixture consisting of 380 g. of acrylic acid ethyl ester and 20 g. of methacrylamide methylol ester of hexahydrobenzoic acid was added within two hours. Within this time the reaction temperature shall not exceed 40° C.

After adding 10% of the total amount of monomers the polymerization is started by adding 1.6 g. of potassium persulfate and 2.4 g. of sodium pyrosulfite. After a polymerization time of about 5 hours a latex having a 40% solids content is obtained. The film from this latex formed at room temperature on a glass plate is insoluble in methyl ethyl ketone and dimethylformamide.

Similar results are obtained if instead of the above monomers a mixture of 250 g. acrylic acid ethyl ester, 130 g. of vinylidene chloride and 20 g. of methacrylamide methylol ester of the phenyl acetic acid is used.

*Example 6*

120 g. of alkyl sodium sulfonate (having an alkyl residue of between 13 and 16 carbon atoms), 120 g. of a reaction product of one mol of stearyl alcohol and 20 mols of ethylene oxide, 21 g. of sodium pyrophosphate and 7.5 g. of triethanolamine are dissolved in 3.22 l. of distilled water and placed in a 10 l. stainless steel autoclave. 1.35 kg. stabilizer-free butadiene is introduced in the autoclave at 25° C. After adding a mixture of 900 g. of acrylonitrile, 300 g. of freshly distilled styrene, 450 g. of acrylic acid-2-ethyl-hexylester, 12 g. of diisopropylxanthogen-disulfide and 120 g. of α-chloroacrylamide-methylol-valeric acid ester the polymerization is started by means of 15 g. potassium persulfate. After a reaction time of 24 hours a latex with a 37.5% solids content is obtained which is freed from unreacted monomers by heating at 40° C. over 4 hours in vacuum after addition of 45 g. of a phenolic stabilizer (for example hydroquinone).

*Example 7*

25 parts of a 40% polybutadiene latex, 134.5 parts of a solution of 130 parts of desalted water, 4 parts of sodium alkyl sulfonate (the alkyl radical having about 16 carbon atoms) and 0.5 part of triethanol amine are mixed and placed into a polymerization vessel fitted with a stirrer, thermometer, reflux condenser and a gas inlet tube. 85 parts of acrylic acid butyl ester and 5 parts of methacrylic acid amide methylol ester of butyric acid are emulsified with the above mixture. The emulsion is heated to 30° C. after displacing the air in the reaction vessel by nitrogen and the polymerization is started by adding 0.3 part of potassium persulfate dissolved in 5 parts of water. After a polymerization time of 5 hours a stable coagulate-free polymer latex is obtained which has a solids content of 38%.

10 ccm. of an obtained dispersion is poured out on a glass plate. After drying at room temperature a film has been formed which shows high elasticity and is insoluble in toluene, acetone and dimethylformamide.

*Example 8*

50 g. of the monomer

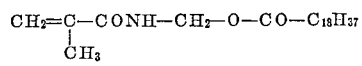

are dissolved in 450 g. of thiophene-free benzene. This solution is heated to 70° C. after displacing the air in the reaction vessel by nitrogen and the polymerization is started by adding 0.25 g. of azodiisobutyric acid dinitrile. Polymerization begins after 40 minutes and is finished after about 18–19 hours. The obtained clear viscous solution has a 7.3% solids content of a homopolymer having a K-value (according to Fikentscher) of 32. The so-obtained latex is poured out on a glass plate and carefully dried at 20° C. The so-dried film is soluble in dimethylformamide. Contrary to this, this film becomes insoluble in dimethylformamide after heating for ½ hour to 80° C., respectively some minutes to about 100° C.

We claim:

1. A process for preparing a polymeric material having self-crosslinking properties which comprises polymerizing at a temperature of 10–80° C. in the presence of a catalyst selected from the group consisting of a peroxide polymerization catalyst and azodiisobutyric acid dinitrile, a member selected from the group consisting of (A) an acrylic acide amide derivative of the general formula

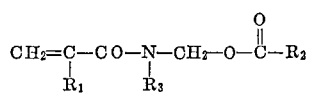

wherein $R_1$ represents a member selected from the group consisting of hydrogen, a methyl group and a chlorine atom; $R_2$ represents a member selected from the group consisting of a saturated aliphatic hydrocarbon radical containing from 2 to 20 carbon atoms, a cycloaliphatic radical, an aryl radical, a heterocyclic ring and an araliphatic radical and $R_3$ represents a member selected from the group consisting of a hydrogen atom and a methyl group, and (B) 0.2 to 50% by weight of said acrylic acid amide derivative of said formula and 50–99.8% by weight of at least one further olefinically unsaturated monomer having at least one terminal $CH_2=C<$ group and being copolymerizable with said acrylic acid amide derivative according to said formula, said further monomer being a member selected from the group consisting of an α,β-olefinically unsaturated monocarboxylic acid, an α,β-olefinically unsaturated monocarboxylic acid amide, an α,β-olefinically unsaturated monocarboxylic acid nitrile, an α,β-olefinically unsaturated monocarboxylic acid ester being the ester of an aliphatic saturated monohydric alcohol of from 1 to 20 carbon atoms, a styrene, an ester of vinyl-alcohol with an aliphatic saturated monocarboxylic acid, vinyl chloride, vinylidene chloride, a vinyl ether, an aliphatic conjugated diolefine with 4 to 6 carbon atoms, a N-methylolether of methacrylic acid amide, a Mannich base of acrylic acid amide and a Mannich base of methacrylic acid amide.

2. A process for preparing a polymeric material having self-crosslinking properties which comprises polymerizing at a temperature of 10–80° C. in the presence of a catalyst selected from the group consisting of a peroxide polymerization catalyst and azodiisobutyric acid dinitrile (1) 0.2 to 50% by weight of an acrylic acid amide derivative of the general formula

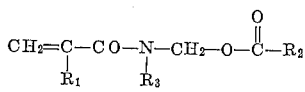

wherein $R_1$ represents a member selected from the group consisting of hydrogen, a methyl group and a chlorine atom; $R_2$ represents a member selected from the group consisting of a saturated aliphatic hydrocarbon radical containing from 2 to 20 carbon atoms, a cycloaliphatic radical, an aryl radical, a heterocyclic ring and an araliphatic radical and $R_3$ represents a member selected from the group consisting of a hydrogen atom and a methyl group, and (2) 50 to 99.8% by weight of at least one further olefinically unsaturated monomer having at least one terminal $CH_2=C<$ group and being copolymerizable with said acrylic acid amide derivative according to said formula, said further monomer being a member selected from the group consisting of an α,β-olefinically unsaturated monocarboxylic acid, an α,β-olefinically unsaturated monocarboxylic acid amide, an α,β-olefinically unsaturated monocarboxylic acid nitrile, an α,β-olefinically unsaturated monocarboxylic acid ester being the ester of an aliphatic saturated monohydric alcohol of from 1 to 20 carbon atoms, a styrene, an ester of vinyl alcohol with an aliphatic saturated monocarboxylic acid, vinyl chloride, vinylidene chloride, a vinyl ether, an aliphatic conjugated diolefine with 4 to 6 carbon atoms, a N-methylolether of methacrylic acid amide, a Mannich base of acrylic acid amide and a Mannich base of methacrylic acid amide.

3. A process as claimed in claim 2 wherein copolymerization of monomers (1) and (2) is carried out in aqueous emulsion at pH-values of about 3 to 9 and temperatures not exceeding 50° C.

4. A process for preparing a polymeric material having self-crosslinking properties which comprises polymerizing at a temperature of 10–80° C. in the presence of a catalyst selected from the group consisting of a peroxide polymerization catalyst and azodiisobutyric acid dinitrile, an acrylic acid amide derivative of the general formula

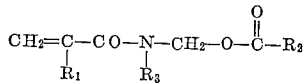

wherein $R_1$ represents a member selected from the group consisting of hydrogen, a methyl group and a chlorine atom; $R_2$ represents a member selected from the group consisting of a saturated aliphatic hydrocarbon radical containing from 2 to 20 carbon atoms, a cycloaliphatic radical, an aryl radical, a heterocyclic ring and an araliphatic radical and $R_3$ represents a member selected from the group consisting of a hydrogen atom and a methyl group.

5. A polymeric material selected from the group consisting of homopolymers of an acrylic acid amide derivative of the general formula

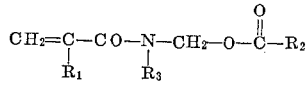

wherein $R_1$ represents a member selected from the group consisting of hydrogen, a methyl group and a chlorine atom, $R_2$ represents a member selected from the group consisting of a saturated aliphatic hydrocarbon radical containing from 2 to 20 carbon atoms, a cycloaliphatic radical, an aryl radical, a heterocyclic ring system and an araliphatic radical and $R_3$ represents a member selected from the group consisting of a hydrogen atom and a methyl group, and copolymers of (1) 0.2 to 50% by weight of said acrylic acid amide derivative of said formula and (2) 50–99.8% by weight of at least one further olefinically unsaturated monomer having at least one terminal $CH_2=C<$ group and being copolymerizable with said acrylic acid amide derivative according to the said formula, said further monomer being a member selected from the group consisting of an α,β-olefinically unsaturated monocarboxylic acid, an α,β-olefinically unsaturated monocarboxylic acid amide, an α,β-olefinically unsaturated monocarboxylic acid nitrile, an α,β-olefinically unsaturated monocarboxylic acid ester being the ester of an aliphatic saturated monohydric alcohol of from 1 to 20 carbon atoms, a styrene, an ester of vinyl-alcohol with an aliphatic saturated monocarboxylic acid, vinyl chloride, vinylidene chloride, a vinyl ether, an aliphatic conjugated diolefine with 4 to 6 carbon atoms, a N-methylolether of methacrylic acid amide, a Mannich base of acrylic acid amide and a Mannich base of methacrylic acid amide.

6. A homopolymer of an acrylic acid amide derivative of the general formula

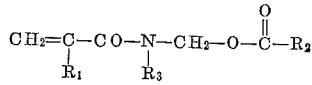

wherein $R_1$ represents a member selected from the group consisting of hydrogen, a methyl group and a chlorine atom, $R_2$ represents a member selected from the group consisting of a saturated aliphatic hydrocarbon radical containing from 2 to 20 carbon atoms, a cycloaliphatic radical, an aryl radical, a heterocyclic ring system and an araliphatic radical and $R_3$ represents a member selected from the group consisting of a hydrogen atom and a methyl group.

7. A copolymer of
(1) 0.2 to 50% by weight of an acrylic acid amide derivative of the general formula

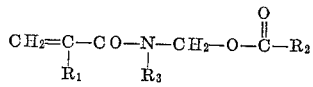

wherein $R_1$ represents a member selected from the group consisting of hydrogen, a methyl group and a chlorine atom; $R_2$ represents a member selected from the group consisting of a saturated aliphatic hydrocarbon radical containing from 2 to 20 carbon atoms, a cycloaliphatic radical, an aryl radical, a heterocyclic ring system and an araliphatic radical and $R_3$ represents a member selected from the group consisting of a hydrogen atom and a methyl group, and (2) 50 to 99.8% by weight of at least one further olefinically unsaturated monomer having at least one terminal $CH_2=C<$ group and being copolymerizable with the acrylic acid amide derivative according to said formula, said further monomer being a member selected from the group consisting of an α,β-olefinically unsaturated monocarboxylic acid, an α,β-olefinically unsaturated monocarboxylic acid amide, an α,β-olefinically unsaturated monocarboxylic acid nitrile, an α,β-olefinically unsaturated monocarboxylic acid ester being the ester of an aliphatic saturated monohydric alcohol of from 1 to 20 carbon atoms, a styrene, an ester of vinyl-alcohol with an aliphatic saturated monocarboxylic acid, vinyl chloride, vinylidene chloride, a vinyl ether, an aliphatic conjugated diolefine with 4 to 6 carbon atoms, a N-methylolether of methacrylic acid amide, a Mannich base of acrylic acid amide and a Mannich base of methacrylic acid amide.

8. A copolymer of 3% by weight of a methacrylic acid amide derivative of the formula

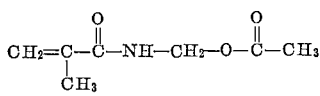

58% by weight of butyl acrylate, 36.5% by weight of styrene and 2.5% by weight of acrylamide.

9. A copolymer of 3% by weight of a methacrylic acid amide derivative of the formula

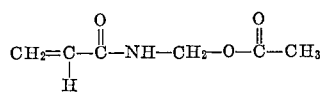

58% by weight of butyl acrylate, 36.5% by weight of styrene and 2.5% by weight of acrylamide.

10. A copolymer of 40% by weight of a methacrylic acid amide derivative of the formula

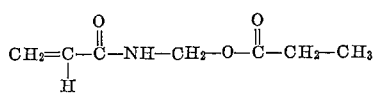

and 60% by weight of acrylamide.

11. A copolymer of 5% by weight of a methacrylic acid amide derivative of the formula

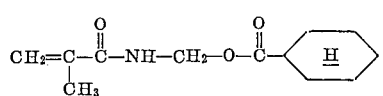

and 95% by weight of ethylacrylate.

12. A coplymer of 5% by weight of a methacrylic acid amide derivative of the formula

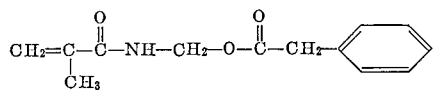

62.5% by weight of ethylacrylate and 32.5% by weight of vinyl chloride.

13. Process for crosslinking a polymeric material as claimed in claim 6 which comprises heating said polymer to temperatures of between 20° C. and 200° C. over periods between 0.5 minute and about 10 days, the heating time depending on the height of the heating temperature.

14. Process for crosslinking a polymeric material as claimed in claim 7 which comprises heating said polymer to temperatures of between 20° C. and 200° C. over periods between 0.5 minute and about 10 days, the heating time depending on the height of the heating temperature.

15. Process for crosslinking a polymeric material as claimed in claim 6 which comprises acidifying an aqueous polymer dispersion of the polymer as claimed in claim 4 to a pH-value between 2 and 5.

16. Process for crosslinking a polymeric material as claimed in claim 7 which comprises acidifying an aqueous polymer dispersion of the polymer as claimed in claim 7 to a pH-value between 2 and 5.

17. A crosslinked polymeric material obtained by acidifying an aqueous copolymer dispersion as claimed in claim 7 to a pH-value between 2 and 5.

18. A crosslinked polymeric material obtained by heating a copolymer as claimed in claim 7 to temperatures of between 20° C. and 200° C. over periods between 0.5 minute and about 10 days.

References Cited by the Examiner

UNITED STATES PATENTS 2,593,888  4/1952  Jones _____ 260—89.7
2,761,834  9/1956  Suen et al. _____ 260—89.7

FOREIGN PATENTS 1,123,475  2/1962  Germany.

JOSEPH L. SCHOFER, Primary Examiner.

C. R. REAP, Assistant Examiner.